(12) United States Patent
Kodama

(10) Patent No.: US 6,529,297 B1
(45) Date of Patent: Mar. 4, 2003

(54) COLOR HOLOGRAM RECORDING MEDIUM AND PROCESS FOR FABRICATING THE SAME

(75) Inventor: Daijiro Kodama, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/448,471

(22) Filed: Nov. 24, 1999

(30) Foreign Application Priority Data

Nov. 26, 1998 (JP) .......................................... 10-335676

(51) Int. Cl.⁷ ................................................ G03H 1/26
(52) U.S. Cl. ............................ 359/22; 359/12; 359/24; 359/25
(58) Field of Search ............................ 359/12, 22, 24, 359/25

(56) References Cited

U.S. PATENT DOCUMENTS 3,909,102 A * 9/1975 Tsunoda et al. ............. 350/3.5
4,235,505 A 11/1980 Hariharan et al.
4,807,978 A * 2/1989 Grinberg et al. ........... 350/3.73

FOREIGN PATENT DOCUMENTS

| EP | 0 828 203 A2 | 3/1998 | |
|---|---|---|---|
| GB | 2 211 646 A | 7/1989 | |
| JP | A 1013361 * | 5/1998 | .................. 359/22 |
| JP | 10-133611 | 5/1998 | |

* cited by examiner

Primary Examiner—Audrey Chang
Assistant Examiner—Craig Curtis
(74) Attorney, Agent, or Firm—Parkhurst & Wendel, L.L.P.

(57) ABSTRACT

A color hologram recording medium 2 includes volume hologram recording mediums 14R, 14G and 14B for diffracting light of wavelengths different from each other. Reconstruction patterns 1R, 1G and 1B of the volume hologram recording mediums 14R, 14G and 14B are recorded so that the reconstruction patterns 1R, 1G and 1B are reconstructed at reconstruction positions different from each other. Thus, the color hologram recording medium 2 can have a wide variety of designs and artistic characters that the recorded color reconstruction patterns vary depending on watched directions.

11 Claims, 6 Drawing Sheets

COLOR HOLOGRAM RECORDING MEDIUM AND PROCESS FOR FABRICATING THE SAME

BACKGROUND OF THE INVENTION

1. Field of the Invention

The present invention relates to a color hologram recording medium, more specifically to a color hologram recording medium which includes volume holograms containing reconstruction patterns recorded in a plurality of wavelengths, and can have a large variety of designs and artistic characters.

2. Related Art

It is conventionally known that a color hologram recording medium includes volume holograms containing reconstruction patterns of three colors, R (red), G (green) and B (blue). The volume holograms are multi-recorded or overlapped for additive color mixing. It is also known that a color hologram recording medium includes R picture elements or dots, G picture elements or dots and B picture elements or dots which are juxtaposed with one another for additive color mixing resorting to area ratios among them. It has been also proposed by the inventors of the present invention in Japanese Patent Application No. 190970/1997 (Japanese Patent Laid-Open Publication No. 133611/1998) that neutral tints are provided by dot area ratios in such color hologram recording mediums.

However, in the conventional color hologram recording mediums, the volume holograms contain reconstruction patterns of the respective colors so that the reconstruction patterns are reconstructed in the same plane. Accordingly, the conventional color hologram recording mediums cannot provide a variety of designs and artistic characters that, for example, recorded color reconstruction patterns vary depending on watched directions.

SUMMARY OF THE INVENTION

The present invention has been made in light of such disadvantage of the conventional color hologram recording mediums. An object of the present invention is to provide a color respective colors recorded so that the reconstruction patterns of the respective colors can be reconstructed at positions different from each other. Accordingly to the present invention, a wide variety of designs and artistic characters that, for example, the recorded color reconstruction patterns vary depending on watched directions can be provided.

The color hologram recording medium according to the present invention includes a plurality of volume holograms respectively including reconstruction patterns independent from each other, for diffracting light of wavelengths different from each other. The reconstruction patterns of the volume holograms are reconstructed at positions, which are different from each other.

In the above-described color hologram recording medium, it is preferable that the volume holograms are multi-recorded in a recording sensitive material. Also, it is preferable that each of the volume holograms is recorded in each of a plurality of sensitive materials to be laid one on another.

In the above-described color recording medium, it is preferable that the reconstruction patterns of the volume holograms are plane patterns. Also, it is preferable that the plane patterns are parallel with each other. In addition, it is preferable that the volume holograms are reflection/scattering holograms.

In the above-described color recording medium, it is preferable that the reconstruction patterns of the volume holograms are partially overlapped on each other so as to exhibit a neutral tint by additive color mixing of the reconstruction patterns in case that the volume holograms are observed in at least one direction. Also, it is preferable that at least one of the volume holograms has the reconstruction pattern formed in dots.

The process for fabricating the color hologram recording medium according to the present invention includes the step of preparing a plurality of first original plates respectively recording volume holograms which diffract light of wavelengths holograms recorded in the first original plates into second original plates, which are respectively spaced from the first original plates by distances which are different from each other; and the step of multi-recording the volume holograms recorded in the second original plates into a recording sensitive material to fabricate a color hologram recording medium.

The process for fabricating the color hologram recording medium according to the present invention includes the step of preparing a plurality of first original plates respectively recording volume holograms which diffract light of wavelengths different from each other; the step of recording the volume holograms recorded in the first original plates into second original plates which are respectively spaced from the first original plates by distances which are different from each other; the step of recording the volume holograms recorded in the second original plates respectively into recording sensitive materials spaced from the second original plates by a prescribed distance; and the step of laying the respective recording sensitive materials one on another to fabricate a color hologram recording medium.

According to the present invention, the reconstruction patterns of the volume holograms are multi-recorded or overlapped on each other so that the reconstruction patterns can be reconstructed at positions different from each other. Therefore, the reconstruction patterns are visible separately at positions which are depth-wise different from one another. The general pattern of the reconstruction patterns, and the shapes and the layout of the tint regions, that is the overlapped regions between the reconstruction patterns, change when an observation position is displaced. Thus, the color hologram recording medium having a wide variety of designs and artistic characters can be provided.

BRIEF DESCRIPTION OF THE DRAWINGS

By referring now to the accompanying drawings, preferred embodiments of the present invention will be described in detail.

In the drawings.

DESCRIPTION OF THE PREFERRED EMBODIMENTS

Figure 1:
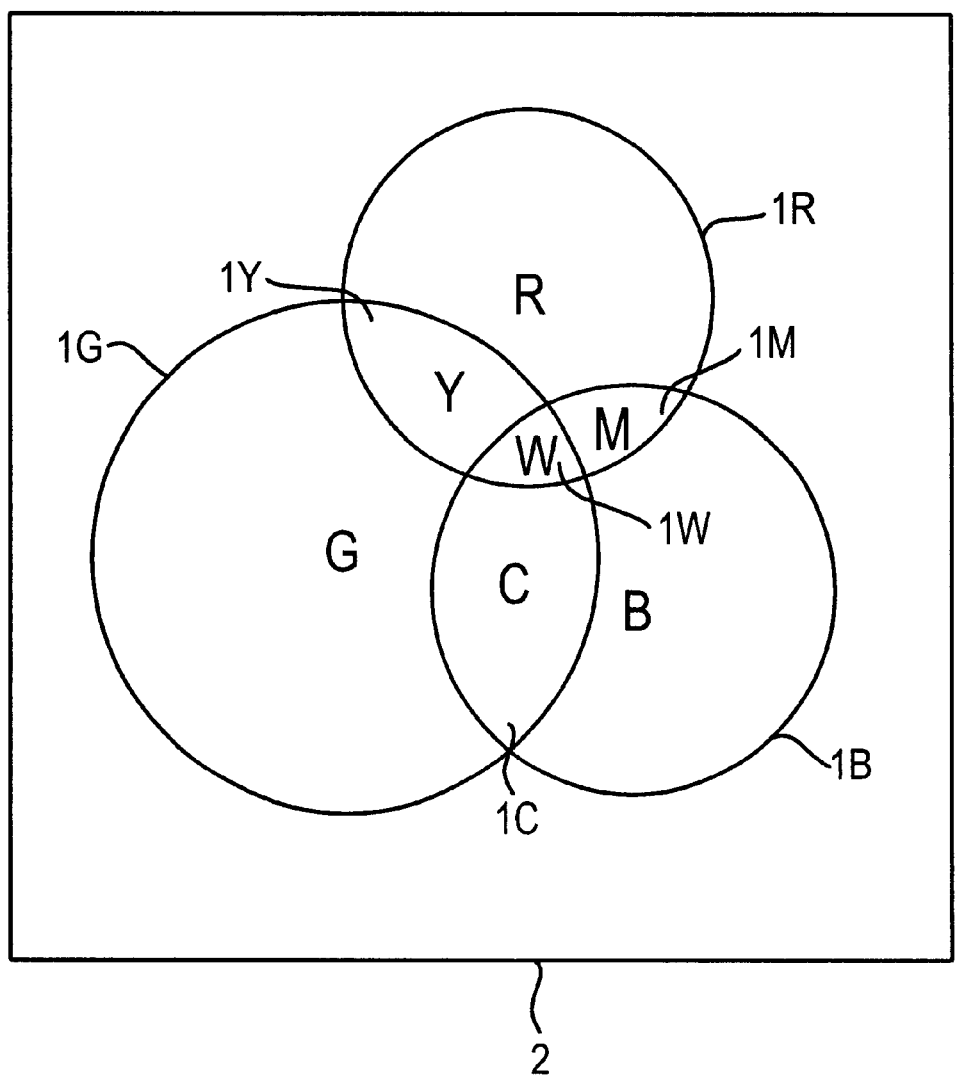
FIG. 1 is a plan view of the color hologram recording medium according to an embodiment of the present invention, which shows a recorded pattern thereof.

To simplify the explanation of the present invention, in the present embodiment, as shown in FIG. 1, the color hologram recording medium 2 containing circular reconstruction patterns 1R, 1G and 1B of R (red), G (green) and B (blue) is fabricated by multi-recording or overlapping a plurality of volume holograms which diffract light of the wavelengths of R, G and B. The circular reconstruction patterns 1R, 1G and 1B are superimposed on each other as shown in FIG. 1. In FIG. 1, reference numeral 1Y represents a region where R and G are added and mixed to appear yellow (Y); reference numeral 1C represents a region where G and B are added and mixed to appear cyan (C); reference number 1M represents a region where R and B are added and mixed to appear magenta (M); and reference numeral 1W represents a region where G and B are added and mixed to appear white (W).

Figure 2:
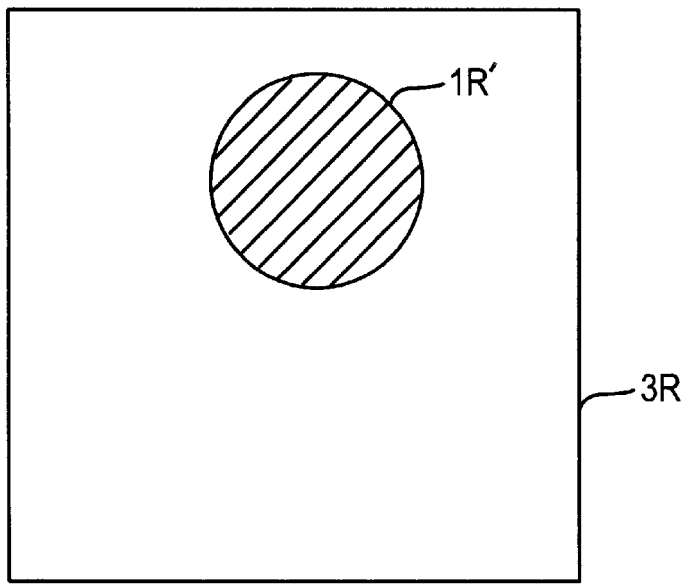
FIG. 2 is a plan view of a mask pattern for R used in fabricating the color hologram recording medium.
Figure 3:
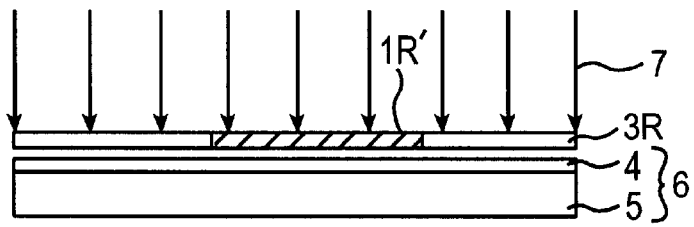
FIG. 3 is a view of assistance in explaining the step of deactivating a part of a recording sensitive material during the process for fabricating the color hologram recording medium shown in FIG. 1.

First, a process for forming an R diffracting volume hologram presenting the circular R pattern 1R will be explained. A mask pattern plate 3R for R having a shield portion 1R' corresponding to the pattern 1R as shown in FIG. 2 is prepared. As shown in FIG. 3, the mask pattern plate 3R is laid on a hologram recording material 6 which includes a transparent substrate 5 and a recording sensitive material 4 for the volume hologram. The recording sensitive material 4 is formed of a photopolymer or others and applied to the transparent substrate 5. UV radiation 7 is applied to the recording sensitive material 4 from the side of mask pattern plate 3R to photosensitize the recording sensitive material 4, whereby a region 4b of the recording sensitive material 4 other than the circular R pattern 1R is deactivated with a region 4a of the volume hologram recording sensitive material 4 corresponding to the pattern 1R remaining photosensitive.

Figure 4:
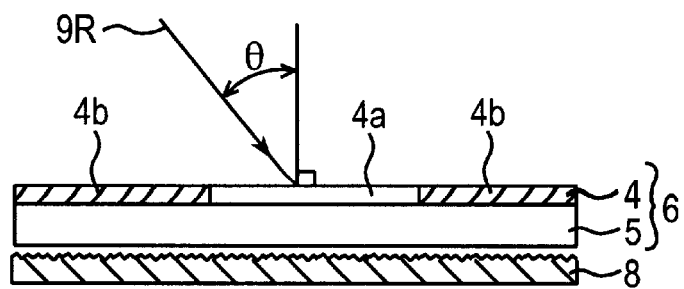
FIG. 4 is a view of assistance in explaining the step of forming an R diffraction first original plate during the process for fabricating the color hologram recording medium shown in FIG. 1.

Then, as shown in FIG. 4, a reflection/scattering plate 8 is positioned in close contact with or near the backside of the hologram recording material 6 with the region 4b of the recording sensitive material 4 deactivated. Light 9R of the R recording material 6 at a prescribed incident angle θ, passes through the recording sensitive material 4 to be reflected/scattered on the reflection/scattering plate 8. The light reflected/scattered on the reflection/scattering plate 8 interferes with the incident light (the light 9R of the R wavelength) in the photosensitive region 4a of the recording sensitive material 4. Thus, an R diffracting first original plate 10R for reflecting/scattering/diffracting light of the R wavelength is formed (see FIG. 5). The reflection/scattering plate 8 may be a usual reflection plate but may be a hologram scattering plate.

Figure 5:
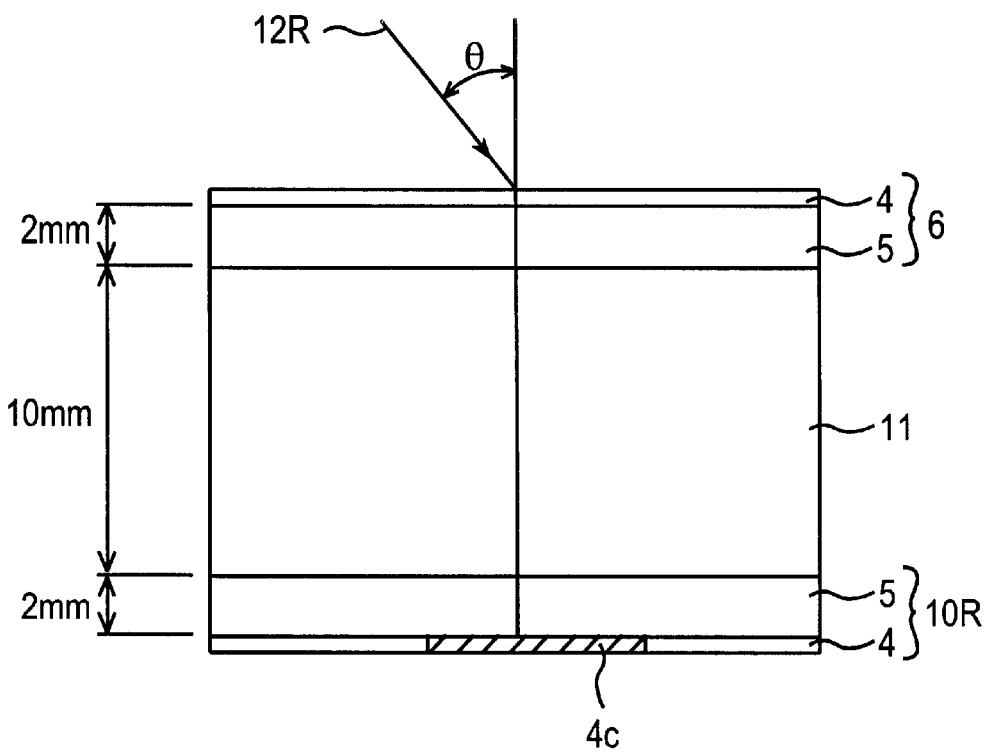
FIG. 5 is a view of assistance in explaining the step of forming an R diffraction second original plate during the process for fabricating the color hologram recording medium shown in FIG. 1.

Next, as shown in FIG. 5, the R diffracting first original plate 10R formed in the arrangement shown in FIG. 4 is turned upside down. A spacer transparent plate 11 is laid on the substrate 5, and another hologram recording material 6 is laid on the spacer transparent plate 11. Light 12R of the R wavelength (the same wavelength as that of the light 9R) is applied to the hologram recording material 6 at the same incident angle θ as that for forming the R diffraction first original plate 10R. At this time, the light 12R of the R wavelength passes through the hologram recording material 6 and the spacer transparent plate 11, and scattered/diffracted light is generated backward with respect to the volume hologram region 4c. The scattered/diffracted light and the incident light (the light 12R of the R wavelength) interfere with each other in the recording sensitive material 4 of the hologram recording material 6. Thus, an R diffraction second original plate 13R for reflecting/scattering/diffracting light of the R wavelength is formed (see FIG. 6).

Figure 6:
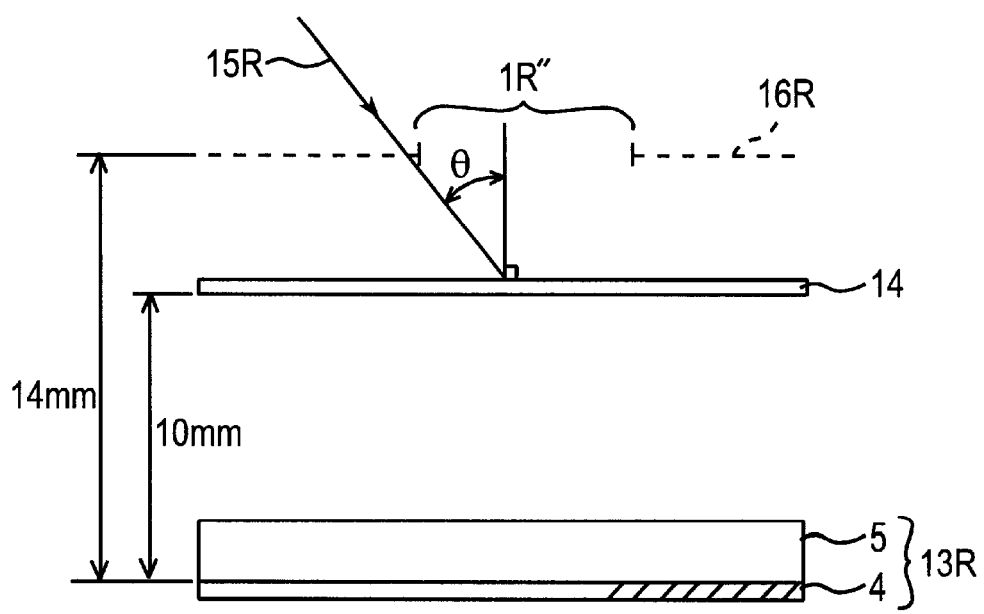
FIG. 6 is a view of assistance in explaining the step of forming an R diffraction volume hologram during the process for fabricating the color hologram recording medium shown in FIG. 1.

Then, as shown in FIG. 6, the R diffracting second original plate 13R formed in the arrangement shown in FIG. 5 is turned upside down, and a volume hologram recording sensitive material 14 of a photopolymer or others is positioned at a prescribed distance from the substrate 5. Light 15R of the R wavelength (the same wavelength as that of the light 9R and the light 12R) is applied to the volume hologram recording sensitive material 14 second original plate 13R. At this time, the light 15R of the R wavelength is diffracted by the R diffracting second original plate 13R, and the diffracted light forms an image at a position (image forming position 16R) corresponding to the relative position of the R diffracting first original plate 10R at the time that the R diffraction second original plate 13R is formed. In the arrangement shown in FIG. 5, when a thickness of the substrate 5 of the hologram recording material 6 is 2 mm, and a thickness of the spacer transparent plate 11 is 10 mm, the image forming position 16R is at a 14 mm distance from the hologram surface of the R diffracting second original plate 13R. At the image forming position 16R, the diffracted light is incident only on a region 1R" corresponding to the circular R pattern 1R.

Here, a layout position of the volume hologram recording sensitive material 14 is spaced by 10 mm from the hologram surface of the R diffracting second original plate 13R as shown in FIG. 6. In this arrangement, the diffracted light from the volume hologram of the R diffracting second original plate 13R to the region 1R" corresponding to the circular R pattern 1R interferes with the incident light 15R in the volume hologram recording sensitive material 14. Thus, an R diffracting volume hologram with the circular R pattern 1R (1R") recorded is formed in the volume hologram recording sensitive material 14. The thus-recorded R diffracting volume hologram recording body is represented by reference numeral 14R (see FIG. 9). The R diffracting volume hologram recording body is a volume hologram which reconstructs and displays the circular R pattern 1R at a position spaced by 4 mm upward from the hologram surface when light of the R wavelength is incident on the hologram surface at an incident angle θ.

Figure 8:
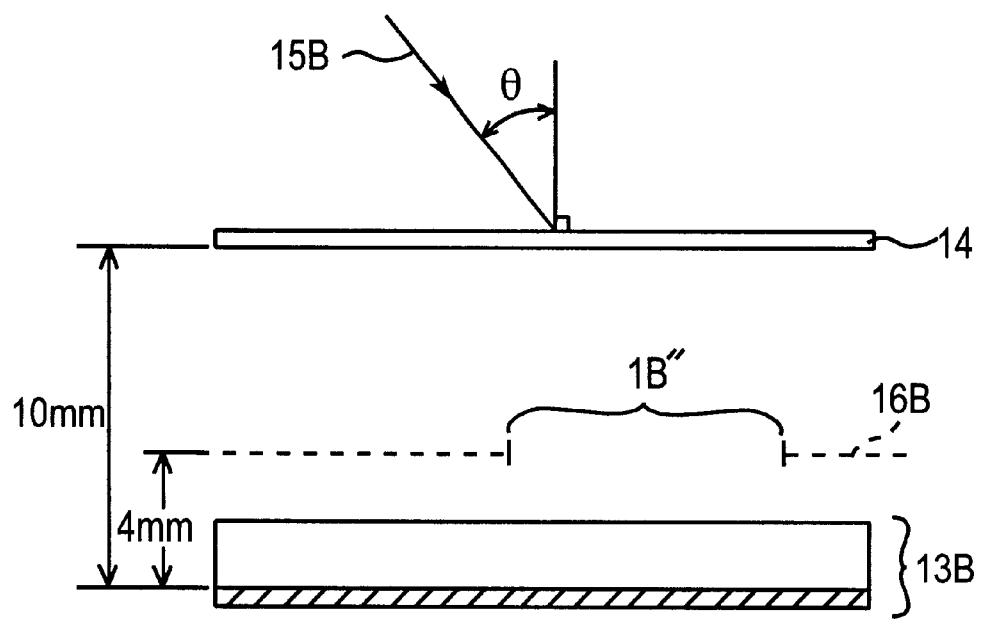
FIG. 8 is a view of assistance in explaining the step of forming a B diffraction volume hologram during the process for fabricating the color hologram recording medium shown in FIG. 1.
Figure 9:
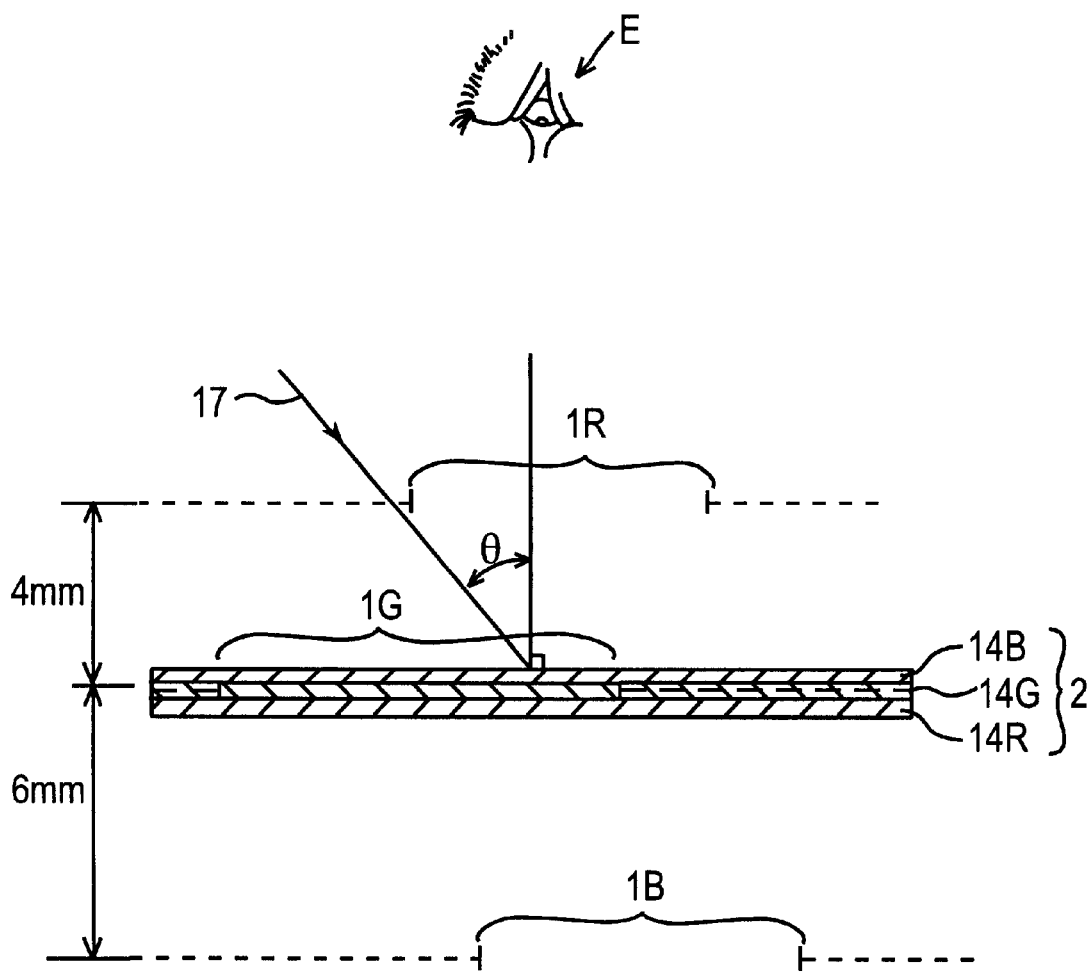
FIG. 9 is a view of assistance in explaining an image reconstructing position of the completed color hologram recording medium according to the embodiment of the present invention.

By performing the steps shown in FIGS. 2 to 6, replacing the wavelength 9R, 12R and 15R of the recording light R by the wavelengths of G and B, a G diffracting first original plate and a G diffracting second original plate 13G are formed (see FIG. 7), and finally a G diffracting volume hologram recording body 14G which reconstructs and displays the circular pattern 1G of plate and a B diffracting second original plate 13B are formed (See FIG. 8), and finally a B diffracting volume hologram recording body 14B which reconstructs and displays the circular pattern 1B of B is formed (see FIG. 9). However, in the arrangement shown in FIG. 5, the spacer transparent plate 11 is 6 mm for forming the G diffracting second original plate 13G but is not used in forming the B diffracting second original plate 13B. Then, in the arrangement shown in FIG. 6, image forming positions 16G, 16B are positioned with respect to the G diffracting second original plate 13G and the B diffracting second original plate 13B are respectively as shown in FIGS. 7 and 8.

Figure 7:
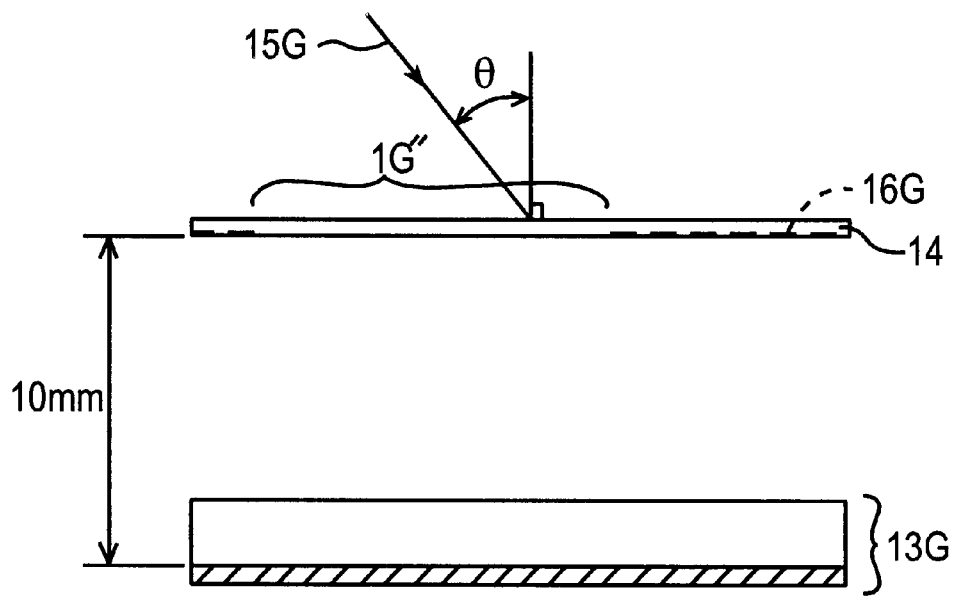
FIG. 7 is a view of assistance in explaining the step of forming a G diffraction volume hologram during the process for fabricating the color hologram recording medium shown in FIG. 1.

That is, in recording the circular pattern 1G (1G") in the G diffracting volume hologram recording sensitive material 14 to form the G diffracting volume hologram recording body, as shown in FIG. 7, an image forming position 16G of the diffracted light from the G diffracting second original plate 13G is identical with the position where the volume hologram recording sensitive material 14 is positioned. Accordingly, the G diffracting volume hologram recorded in the volume hologram recording sensitive material 14 body is a volume hologram which reconstructs and displays the circular G pattern 1G at a position of the hologram surface when light of the G wavelength is incident on the hologram surface at an incident angle θ, In recording the circular pattern 1B (1B") in the B diffracting volume hologram recording sensitive material 14 to form the B diffracting volume hologram recording body, as shown in FIG. 8, an image forming position 16B of the diffracted light from the B diffracting second original plate 13B is spaced by 4 mm from the B diffracting second original plate 13B. Accordingly, the B diffracting volume hologram recorded in the volume hologram recording sensitive material 14 is a volume hologram which reconstructs and displays the circular B pattern 1B at a position spaced by 6 mm downward from the hologram surface when light of the B wavelength is incident on the hologram surface at an incident angle θ.

As shown in FIG. 9, three sheets of the thus-formed R volume hologram recording body 14G and the B diffracting volume hologram recording body 14B are laid one on another to form one sheet of color hologram recording medium 2. Otherwise, three sheets of the hologram recording bodies 14R, 14G and 14B are multi-recorded in another sheet of the recording sensitive material to form the color hologram recording medium 2. When white light 17, or light containing the R wavelength, the G wavelength and the B wavelength is applied to the thus-formed color hologram recording medium 2 at the same incident angle θ as that for forming the respective volume hologram recording bodies 14R, 14G and 14B, and the color hologram recording medium 2 is observed with the eyes from the side of the incidence, the circular R pattern 1R is spaced by 4 mm upward from the surface of the color hologram recording medium 2, the circular G pattern 1G is visibly reconstructed at the same position as the surface of the color hologram recording medium 2, and the circular B pattern 1B is visibly reconstructed at a position deeper by 6 mm than the surface of the color hologram recording medium 2. That is, the three patterns 1R, 1G and 1B of the different colors are visible separately at positions which are depth-wise different from one another.

Accordingly, when the color hologram recording medium 2 is watched at the front, as shown in FIG. 1, the circular R, G and B patterns 1R, 1G and 1B appear, partially overlapping one another. Owing to the additive color mixing, the overlapped region between the patter 1R and the pattern 1G appears yellow (Y), the overlapped region between the pattern 1G and the pattern 1B appears cyan (C), the overlapped region among the pattern 1R, the pattern 1B appears magenta (M), and the overlapped region between the pattern 1R and the pattern 1G and the pattern 1B appears white (W).

Figure 10A:
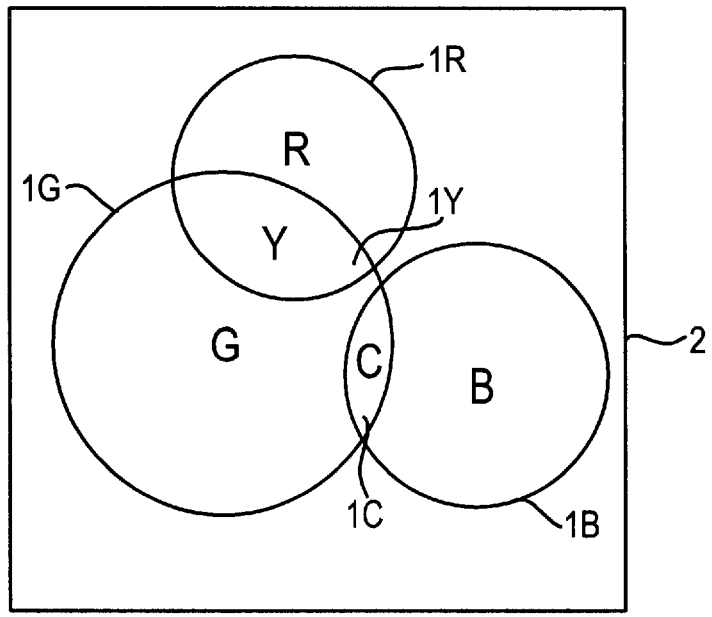
FIGS. 10A and 10B are views of assistance in explaining variations of patterns given when the color hologram recording medium shown in FIG. 9 is observed at different view points.
Figure 10B:
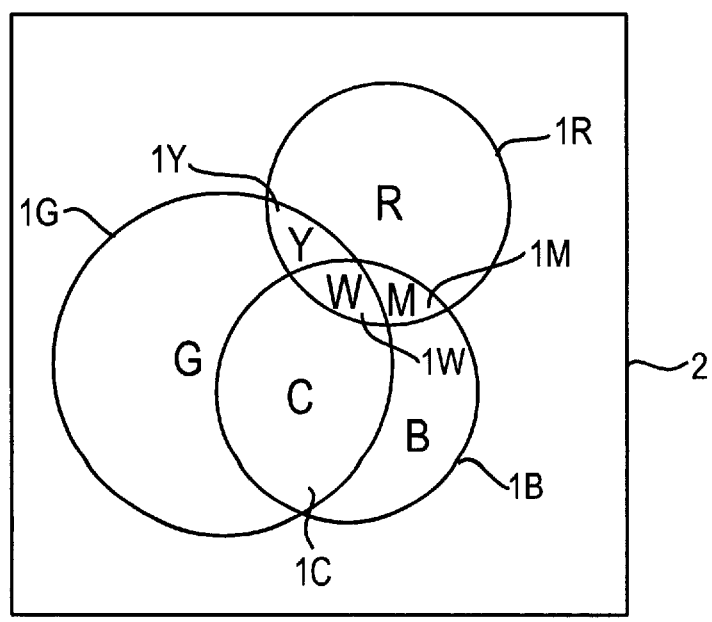

When an observation position is displaced from the front to the right, as shown in FIG. 10A, with respect to the pattern 1G of G fixed to the surface of the color hologram recording medium 2, the pattern 1R of R positioned in front of the pattern 1G moves to the left, the pattern 1B positioned behind the pattern 1G moving the case shown in FIG. 10A the magenta region 1M and the white region 1W disappear. When an observation position is displaced from the front to the left, as shown in FIG. 10B, with respect to the pattern 1G of G fixed to the surface of the color hologram recording medium 2, the pattern 1R of R positioned in front of the pattern 1G moves to the right, the pattern 1B positioned behind the pattern 1G moves to the left. Not only a shape of the general pattern, but also shapes of the respective color regions change.

In the above-described embodiment, all the respective color regions are solidly colored throughout their regions (see FIG. 2). However, a lightness of a color to be recorded (e.g., R) can be adjusted by forming the shield portion of the mask pattern in a dot pattern having an arbitrary dot area ratio in place of the solid light shield pattern. By adjusting lightness of the respective colors, tints of the regions 1Y, 1C, 1M and 1W of the additive color mixing can be adjusted.

The color hologram recording medium and a process for fabricating the same according to the present invention have been explained above by means of an embodiment thereof, but the present invention covers other various modifications. The hologram of the present invention is not limited to the reflection/scattering volume hologram but may be a transmission/scattering volume hologram or a volume hologram which can reconstruct picture patterns, such as cubic images. Dots used in the present invention may be not only collections of shapes, such as fine circles, rectangles, etc., but also collections of fine stripes.

What is claimed is:

1. A color hologram recording medium, comprising:
   a plurality of volume holograms respectively including reconstruction patterns independent from each other, each of said volume holograms diffracting light of wavelengths being different from each other,
   wherein (1) the reconstruction patterns of the volume holograms are reconstructed at positions that are at different distances away from a surface of the color hologram recording medium, (2) the reconstruction patterns of the volume hologram exhibit a neutral tint by additive color mixing of the reconstruction patterns in the case that the volume holograms are partially overlapped in an observation direction, and (3) a shape and a layout of the tint region in which the reconstruction patterns are overlapped is changed in accordance with an observation direction.

2. A color hologram recording medium according to claim 1, wherein the volume holograms are multi-recorded in a recording sensitive material.

3. A color hologram recording medium according to claim 1, wherein each of the volume holograms is recorded in each of a plurality of recording sensitive materials to be laid one on another.

4. A color hologram recording medium according to claim 1, wherein the reconstruction patterns of the volume holograms are plane patterns.

5. A color hologram recording medium according to claim 1, wherein the volume holograms are reflection/scattering holograms.

6. A color hologram recording medium according to claim 1, wherein at least one of the volume holograms has a reconstruction pattern formed in dots.

7. A color hologram recording medium according to claim 4, wherein the plane patterns are parallel with each other.

8. A color hologram recording medium according to claim 4, wherein at least one of the volume holograms has a reconstruction pattern formed in dots.

9. A color hologram recording medium, comprising:
   a plurality of volume holograms respectively including reconstruction patterns independent from each other, each of said volume holograms diffracting light of wavelengths being different from each other,
   wherein (1) the reconstruction patterns of the volume holograms are reconstructed at positions that are at different distances away from a surface of the color hologram recording medium, (2) the reconstruction patterns of the volume hologram exhibit a neutral tint by additive color mixing of the reconstruction patterns in the case that the volume holograms are partially overlapped in an observation direction, (3) the reconstruction patterns of the volume holograms are plane patterns, and (4) a shape and layout of the tint region in which the reconstruction patterns are overlapped is changed in accordance with an observation direction.

10. A color hologram recording medium according to claim 9, wherein the plane patterns are parallel with each other.

11. A color hologram recording medium according to claim 9, wherein at least one of the volume holograms has a reconstruction pattern formed in dots.

* * * * *